(12) United States Patent
Rolland (10) Patent No.: US 7,849,760 B2
(45) Date of Patent: Dec. 14, 2010

(54) SPEED CHANGER WITH PRE-DETERMINED GEARS, PARTICULARLY FOR CYCLES

(75) Inventor: Norbert Rolland, Orvault (FR)

(73) Assignee: Etcetera, Haute Goulaine (FR)

( * ) Notice: Subject to any disclaimer, the term of this patent is extended or adjusted under 35 U.S.C. 154(b) by 1370 days.

(21) Appl. No.: 10/542,274

(22) PCT Filed: Jan. 14, 2004

(86) PCT No.: PCT/FR2004/000057

§ 371 (c)(1),
(2), (4) Date: Jan. 13, 2006

(87) PCT Pub. No.: WO2004/069639

PCT Pub. Date: Aug. 19, 2004

(65) Prior Publication Data

US 2006/0223660 A1 Oct. 5, 2006

(30) Foreign Application Priority Data

Jan. 15, 2003 (FR) .................................. 03 00372

(51) Int. Cl.
G05G 11/00 (2006.01)
G05G 13/00 (2006.01)
F16C 1/10 (2006.01)
F16C 1/12 (2006.01)
(52) U.S. Cl. ........................ 74/489; 74/488; 74/502.2; 74/501.6

(58) Field of Classification Search .................. 74/488, 74/489, 502.2, 501.6, 473.13, 551.8
See application file for complete search history.

(56) References Cited

U.S. PATENT DOCUMENTS 1,114,440 A * 10/1914 Brix ............................ 74/488

(Continued)

FOREIGN PATENT DOCUMENTS

EP 0102259 3/1984

(Continued)

OTHER PUBLICATIONS

PTO 10-0834, Translation of WO 98/36960, Prajczer, Aug. 27, 1998.*

(Continued)

*Primary Examiner*—Vinh T. Luong
(74) *Attorney, Agent, or Firm*—Young & Thompson (57) ABSTRACT

A speed changer is used to control derailleurs using cables from a single rotating handle, the deraileurs being connected respectively to an elastic return element. The speed changer includes at least two cable-maneuvering mechanisms. The mechanism for maneuvering the cable of the rear derailleur, which rotates integrally with the handle, can cause the rear cable to loosen or tighten when the handle is rotated in one direction. The speed changer is characterized in that the rotating assembly, formed by at least one mechanism for maneuvering the rear cable and the handle, can be connected to rotate intermittently with the mechanism for maneuvering the front cable of the front derailleur which, depending on the direction in which the handle is rotated, can cause the front cable of the front derailleur to tighten or loosen.

14 Claims, 7 Drawing Sheets

U.S. PATENT DOCUMENTS

| | | | |
|---|---|---|---|
| 4,201,095 A | 5/1980 | Cirami | |
| 5,921,139 A * | 7/1999 | Yamane | 74/473.13 |
| 5,970,816 A * | 10/1999 | Savard | 74/489 |
| 6,729,203 B2 * | 5/2004 | Wesling et al. | 74/502.2 |
| 6,978,694 B2 * | 12/2005 | Peppard | 74/489 |
| 7,204,169 B2 * | 4/2007 | Mitchell | 74/489 |
| 7,373,854 B2 * | 5/2008 | Chen | 74/501.6 |
| 2005/0126329 A1 * | 6/2005 | Blaschke | 74/501.6 |
| 2008/0148899 A1 * | 6/2008 | Kua et al. | 74/551.8 |

FOREIGN PATENT DOCUMENTS

| | | |
|---|---|---|
| EP | 0727348 | 8/1996 |
| FR | 2530573 | 1/1984 |
| FR | 2750669 | 1/1998 |
| FR | 2758122 | 7/1998 |
| FR | 2758123 | 7/1998 |
| WO | 9115393 | 10/1991 |
| WO | 9503208 | 2/1995 |
| WO | 9836960 | 8/1998 |

OTHER PUBLICATIONS

International Search Report dated Jun. 29, 2004, in PCT application.

* cited by examiner

SPEED CHANGER WITH PRE-DETERMINED GEARS, PARTICULARLY FOR CYCLES

FIELD OF THE INVENTION

This invention relates to a speed changer with predetermined gears, especially for a cycle, for cable control, based on a single rotating grip, of gearshifts connected respectively to an elastic return means, such as a spring, said changer comprising at least two cable operating mechanisms located within a case, one cable operating mechanism of the front gearshift or chainwheel gearshift, the other cable operating mechanism of the rear gearshift or cog gearshift, this second mechanism, jointly in rotation with the grip, able to induce release or pulling of the rear cable during rotation of the grip in the same direction.

BACKGROUND OF THE INVENTION

Most bicycles today are equipped with several chainwheels, generally three in number, and several cogs, generally between 7 and 10. The chainwheels or respectively the cogs have a diameter, and accordingly a number of teeth, that is different from one chainwheel or from one cog to another to allow a choice of gears depending on the chainwheel-cog pair. The highest gear that requires the greatest exertion corresponds to the largest chainwheel and to the smallest cog, whereas the lowest gear that requires the least exertion corresponds to the smallest chainwheel and the largest cog. The user can change gears at will between these two end gears.

It quickly became apparent, however, that a user not used to this plurality of gears could sometimes choose gears incompatible with a long service life of the mechanism. These gears are especially those that cause a major misalignment of the chain, gears such as a large chainwheel/large cog. Moreover, to change from one gear to another without tiring, it is preferable to choose a sequence of gears that causes a progressive increase or decrease of the exertion of the user. At this point, the user has problems in managing this choice of gears. It is often necessary to watch the positioning of its chain on its chainwheels or cogs to effect this choice. Moreover, he sometimes forgets that to change from a cog of a smaller diameter to a cog of a larger diameter reduces the effort to be applied for an identical pedalling rhythm, whereas it is the reverse for the chainwheels, which leads to a selection error.

To avoid all the aforementioned disadvantages, speed changers have been devised.

The first category of speed changer is described especially in patent FR-A-2,530,573. This changer makes it possible to select a chainwheel/cog pair by means of a single control lever. However, the design of the gearshift operating mechanism, the same for the front gearshift and the rear gearshift, is comprised of a cable winding winch and does not allow, for the same direction of actuation of the control lever, actuation of the rear gearshift in two directions in order to preclude a redundant gear or to maintain a relatively constant distance between two successive gears.

A second category of changer that is designed to preclude redundant gears, to prevent overly great misalignments of the chain, and to assign a sequence of gears corresponding to a predetermined speed range, is described especially in European patent EP-A-0,727,348, international applications WO 95/03208 and WO 91/15393 and French patent application FR-A-2,750,669.

This changer thus makes it possible to determine a plurality of cog/chainwheel pairs that will follow one another in a defined manner depending on the actuation of a control device located on the handlebars. This control device is generally located on or in the vicinity of one end of the handlebars, and is preferably comprised of a rotary element such as the well-known rotary grip. This changer makes it possible, when changing a gear, to act solely on one cog, or solely on one chainwheel, or simultaneously on one cog and one chainwheel in order to simultaneously effect a change of the chainwheel and cog in order to optimize the variations of exertion between two successive gears. In these changers, the front or rear gearshift operating mechanism is generally identical. This operating mechanism can be composed especially of cam channels installed on a rotary element. These cam channels can accommodate the ends of the gearshift control cables and in this case are installed in a cylinder as shown by the European patent EP-A-0,727,348. In one variant that is more especially illustrated by international application WO 91/15393, the gearshift control cables are connected to carriages equipped with lugs located in the cam channels of a cylindrical part, the rotation of the cylindrical part causing displacement of the carriages and accordingly the traction or respectively the release of the control cables. A similar principle is disclosed in the U.S. Pat. No. 4,201,095. All these approaches based on one or more cam channels have the disadvantage of inducing a large space requirement of the assembly. As for the speed changer described in patent FR-A-2,750,669, it comprises two different cable operating mechanisms. As in the aforementioned documents, however, these operating mechanisms are permanently actuated in a simultaneous manner. This leads to the necessity of inducing a movement of the sheath relative to the rotary grip. This movement engenders the problem of tightness of the device. One approach, such as the one that is described in patent FR-A-2, 758,122 or FR-A-2,758,123, implements cable actuating mechanisms that are again identical and that are especially comprised of a cable winding drum such that simultaneously changing a chainwheel and a cog based on a single control element to avoid a redundant gear is impossible.

Finally, there are likewise speed changers such as those described in international application WO 98/36960 in which the single control grip is a grip that is able to be moved rotationally and translationally so as to act either on the chainwheel alone, or on the cog alone, or on the assembly. Such a solution again requires mental flexibility from the user.

SUMMARY OF THE INVENTION

One purpose of this invention is thus to suggest a speed changer of a new type whose design makes it possible to reduce its space requirement and to limit its wear over time without, however, degrading its performance.

Another purpose of this invention is to suggest a speed changer of a new type whose design enables amplification of the cable pull path or minimization of the cable release path for allowing production tolerances without increasing the control effort and the space requirement of the assembly.

For this purpose, the object of the invention is a speed changer with a predetermined gear, especially for a cycle, for cable control, based on a single rotating grip, of gearshifts connected respectively to an elastic return means, such as a spring, said changer comprising at least two cable operating mechanisms located within a case, one cable operating mechanism of the front gearshift or chainwheel gearshift, the other cable operating mechanism of the rear gearshift or cog gearshift, this second mechanism, jointly in rotation with the grip, able to induce release or pulling of the rear cable during rotation of the grip in the same direction, characterized in that the rotary assembly formed at least from the rear cable operating mechanism and the grip can be rotationally coupled intermittently to the front cable operating mechanism of the chainwheel gearshift, this front cable operating mechanism, when coupled, being able to cause pulling or release of the front cable of the chainwheel gearshift depending on the direction of rotation of the grip.

Based on this design of the speed changer, it is possible to preclude any redundancy of the selected gears while maintaining optimum alignment of the chain. It is likewise possible to choose gears in such a manner as to have a variation of exertion essentially constant from one gear to another. The intermittent driving of one of the cable operating mechanisms, moreover, makes it possible to limit wear on the assembly and to reduce the dimensions of the assembly.

According to one preferred embodiment of the invention, the rotary assembly formed from the rear cable operating mechanism and the grip can be rotationally coupled in an intermittent manner to the front cable operating mechanism of the chainwheel gearshift via at least one element that rotates jointly with the grip and that can move axially along the axis parallel to the axis of the grip, during rotational displacement of the latter.

BRIEF DESCRIPTION OF THE DRAWINGS

The invention will be better understood by reading the following description of embodiments with reference to the attached drawings, in which.

DETAILED DESCRIPTION OF EMBODIMENTS

The speed changer 1, the subject matter of the invention, is designed more particularly to be used on cycles or bicycles. Similarly, however, it can also be used for any transmission comprising a drive shaft equipped with at least two chainwheels and one gearshift and a shaft equipped with at least two cogs and one gearshift. This speed changer 1 is designed to allow control of the gearshift 5, i.e., the chainwheel gearshift and/or of the rear gearshift 6, i.e., the cog gearshift, based on a single rotary grip 2 mounted in the vicinity of the handlebars of the cycle.

The front gearshift 5 and the rear gearshift 6 can be conventional gearshifts. Thus, the front gearshift 5 can be composed of a movable yoke that follows an axis essentially parallel to the axis of the pedals, this yoke being designed to guide the chain for its passage from one chainwheel to another. As for the rear gearshift 6, it is generally composed of a roller that can move laterally and that pushes the chain on its slack side to allow passage of the chain from one cog to another.

These gearshifts 5, 6 are connected respectively to an elastic return means, such as a spring, that is designed to act on the gearshift control cable. Thus, in the examples shown, the control cable of the front gearshift 5 with chainwheels is shown at 3, while the control cable of the rear gearshift 6 is shown at 4. The operating mechanism 8 of the rear cable 4 is composed of a drum 8A that rotates jointly with the grip 2. This positive rotational connection can be obtained via splines located respectively on the axis of the grip 2 and in the bore of the drum 8A. Thus, this drum 8A is free in translation relative to grip 2. This drum 8A, on its outside periphery, comprises at least one track 8B1, 8B2 for guiding the head 11 of the cable 4. The head 11 of the cable 4 moves translationally along one axis that is essentially parallel to the axis of rotation of the grip 2 as it follows the profile of the track 8B1, 8B2 obtained by rotation of the grip 2. This displacement of the head 11 of the cable, depending on its direction, causes release or pulling of the rear cable 4 of the rear gearshift 6.

In the examples shown, the head II of the cable 4 is composed of two lugs 12 that can interwork alternately with one segment of the track 8B1, 8B2 of the drum 8A, this track being composed of two segments that are axially offset. This head 11 of the cable 4 is provided with a spring 13 that returns at least one part of the head 11 into permanent contact with the track 8B1, 8B2. The translational motion of the cable head 11 is guided via a slide (not shown) implemented in the case 18 that accommodates the cable operating mechanisms 7 and 8. It should be noted that the spring 13 plays a critical part when the speed changer is not installed. Actually, when the speed changer is installed, the cable head 11 is brought into permanent contact with one of the segments of the track via the spring with which the rear gearshift is provided. The fact of arranging the two track segments 8B1, 8B2 that act nonsimultaneously allows the drum 8A to be made more compact and the space requirement of this drum to be reduced. The axial displacement of the cable head 11, induced by rotation of the grip, causes pulling of the cable 4 or release of the cable 4 respectively, depending on the profile of the track followed, in such a way as to allow a change of the cog via the rear gearshift 6, either by passage to a cog of smaller diameter or of greater diameter for the same direction of rotation of the grip 2. The drum 8A is equipped with means of immobilization in a plurality of predetermined angular positions, each corresponding to positioning of the rear gearshift 6 on a cog. In the example shown, these immobilization means are composed of notches 14A and teeth 14B, with a preferably truncated triangular profile, supported by the front surface of the drum 8A and the stationary part with regard to the case 18 respectively. These immobilization means, moreover, allow axial displacement of the drum 8A in the direction of pulling of the cable 4 as the latter is being rotationally driven via the grip 2. This drum 8A is, moreover, returned in the opposite direction by suitable return means. This linear axial movement of the drum 8A makes it possible to amplify the motion of the cable 4, called "over shifting." In fact, in the case of traction or pulling of the cable, if the path of the cable necessary to change, for example, from one cog or one chainwheel is 3 mm, the cable will traverse a path of 4 mm before being released. The gearshift spring then allows repositioning of the operating mechanism in a predetermined angular position. Conversely, in the case of release of the cable, the cable must traverse a path of 2 mm to ultimately obtain a path of 3 mm. This phenomenon is called "undershifting." Again, this is the action of the return means or spring of the gearshift that allows this final path of 3 mm. These amplifications or minimizations of movement are necessary to make up for all the operating play and imprecision of these assemblies. In fact, for example over the course of time, a lengthening of the cable is observed due to its wear.

Thus, to recapitulate, with respect to operation of the rear chainwheel gearshift 6, the rotational driving of the grip 2 initially causes axial displacement of the drum 8A by interaction of the notches 14A and the teeth 14B, then, during rotational driving of the drum 8A by the grip 2, axial displacement of the head 11 of the cable 4, this axial displacement causing release or pulling of the rear cable 4 as a function of the profile of the track followed by the cable head 11. This action on the cable 4 allows the cog to be changed via the gearshift 6. It is observed that based on the design of this operating mechanism, for the same direction of rotational driving of the grip, release or pulling of the cable 4 depending on the profile of the track can be induced.

Figure 1:
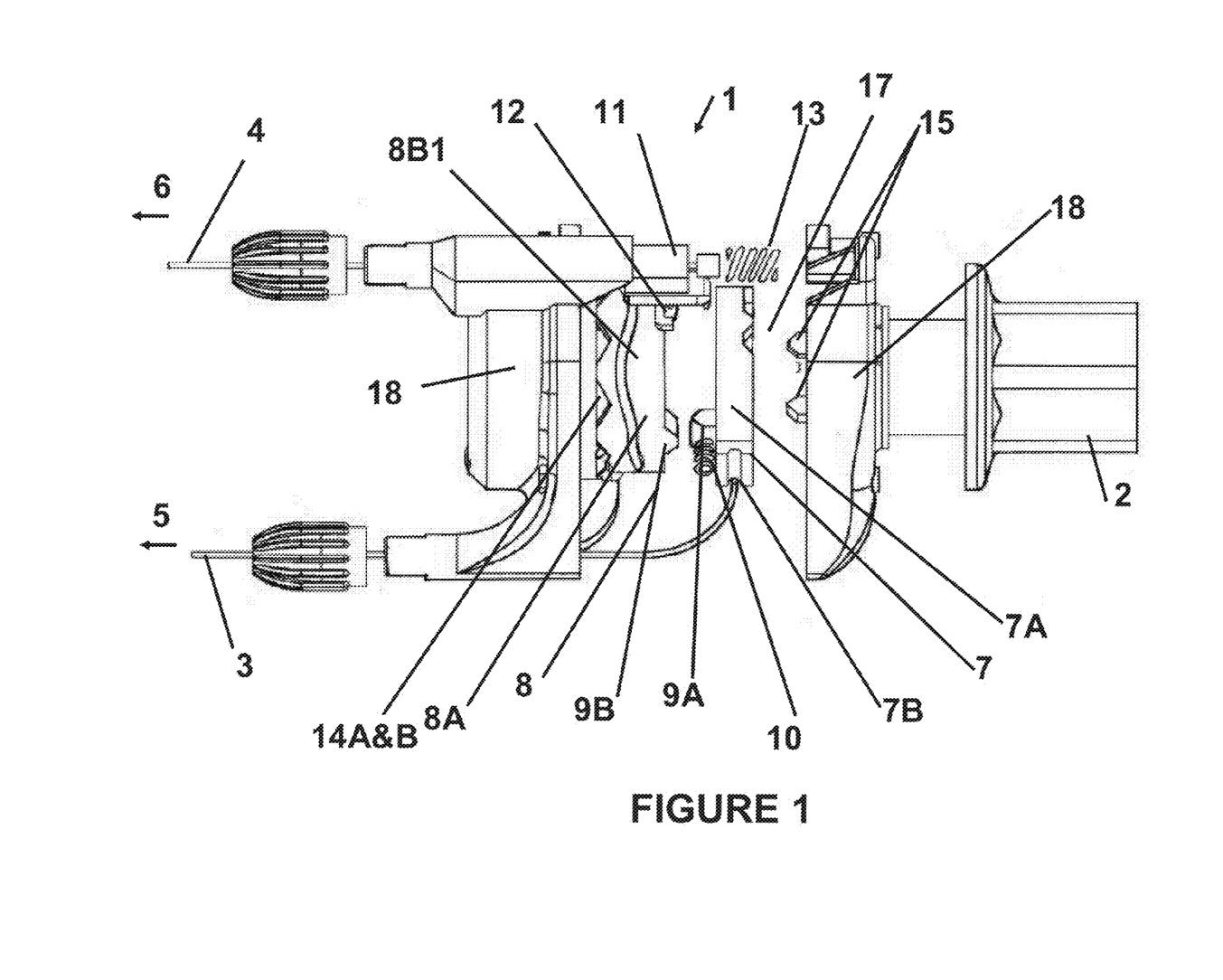
FIG. 1 shows a partial exploded view of a speed changer according to the invention in the open position of the case.

This rotary assembly, formed by the operating mechanism 8 of the rear cable 4 and the grip 2, can be rotationally coupled intermittently to the operating mechanism 7 of the front cable 3 of the chainwheel gearshift 5. This operating mechanism 7 of the front cable 3, when coupled, is able to induce pulling or release of the front cable 3 of the gearshift 5 of one chainwheel depending on the direction of rotation of the grip 2. Thus, this operating mechanism 7 of the cable 3 can cause changing of the chainwheel parallel to changing of the cog obtained by means of the operating mechanism 8 of the cable 4. This intermittent rotary coupling of the assembly composed of the operating mechanism 8 of the rear cable 4/grip 2 with the operating mechanism 7 of the front cable 3 of the front gearshift 5 can be obtained by at least one axial displacement of the operating mechanism 8 of the rear cable 4 along an axis essentially parallel to the axis of rotation of the grip 2 during one rotation of the latter. Thus, axial displacement, such as was mentioned above, is obtained by the action of the notches 14A and teeth 14B and allows, on the one hand, amplification of the motion of the rear cable, and, on the other hand, axial displacement of the drum 8A to allow possible coupling to the operating mechanism 7 of the front cable 3. In the examples shown, the assembly formed by the operating mechanism 8 of the rear cable 4 and of the grip 2 can be rotationally coupled intermittently with the operating mechanism 7 of the front cable 3 of the front gearshift 5 by jaw clutching after axial displacement of the operating mechanism 8 of the rear cable 4 in the direction of the operating mechanism 7 of the front cable. The jaw 9A, 9B extends between the operating mechanisms 7, 8 of the cable 3, 4 as shown in FIG. 1, in which the front surface of the drum 8 is equipped with teeth of the jaw 9B, whereas the front surface of the winch 7A that will be described below and that is used to wind the front cable 3 comprises teeth 9A on its front surface with respect to that of the drum.

Figure 7:
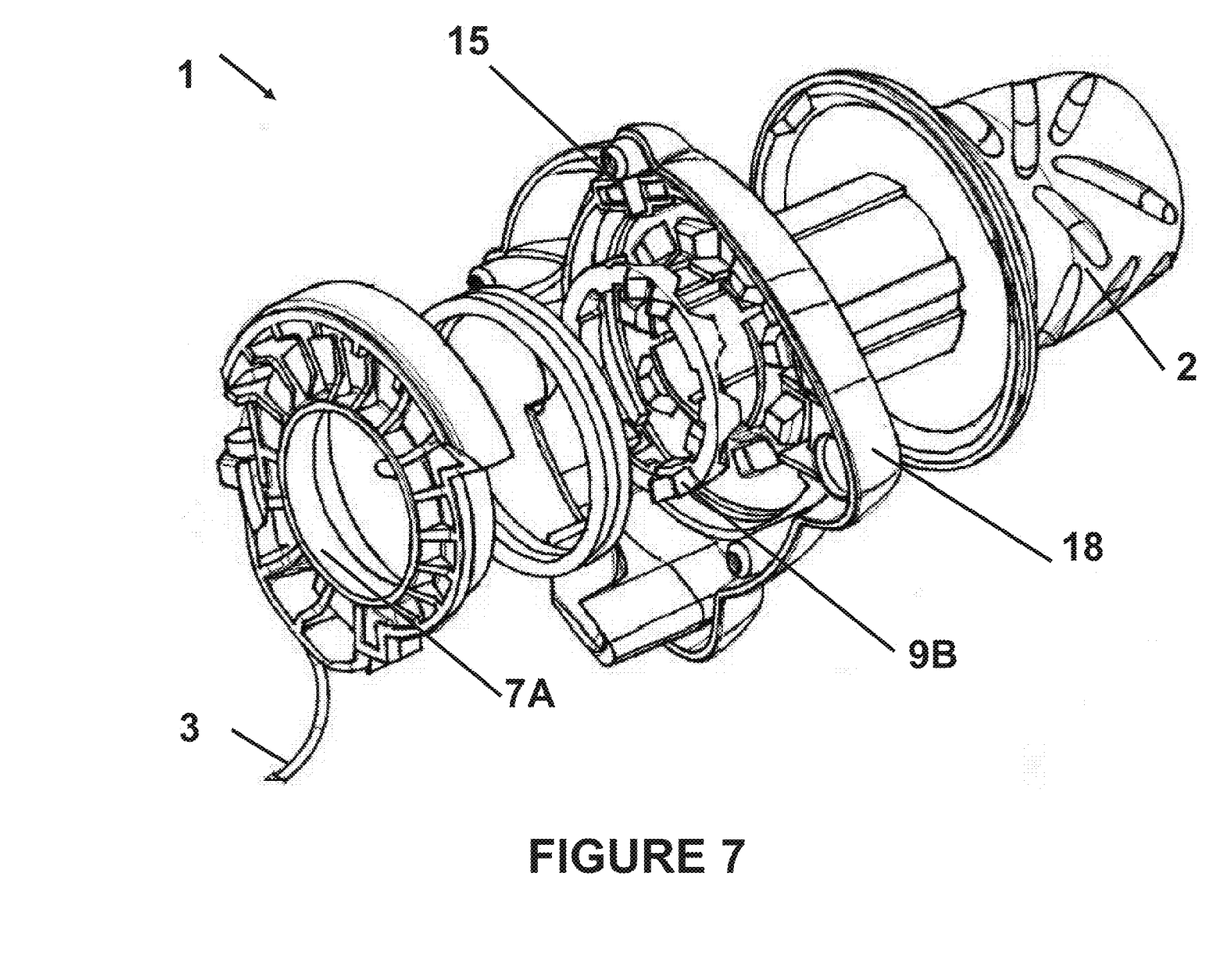

In another embodiment of the invention shown in FIG. 7, the teeth 9B of the jaw are borne on a ring that rotates jointly with the grip 2 and that can be axially displaced during one rotation of the grip using lugs positioned on said grip. This axial displacement of the ring that is rotating jointly with the grip 2 and that bears the teeth 9B of the jaw allows interworking of the teeth 9B of the jaw with the teeth 9A that are borne on the front surface of the winch 7A that will be described below and that is used to wind the front cable 3. In this case, again, jaw clutching is obtained by axial displacement of a moving piece along the axis that is parallel to the axis of rotation of the grip during rotational displacement of the latter, this approach being distinguished from the preceding approach by the fact that only here can the piece bearing some of the teeth of the jaw be axially displaced, and no longer the entire operating control mechanism of the rear cable 4 during rotary driving by the grip.

Figure 6:
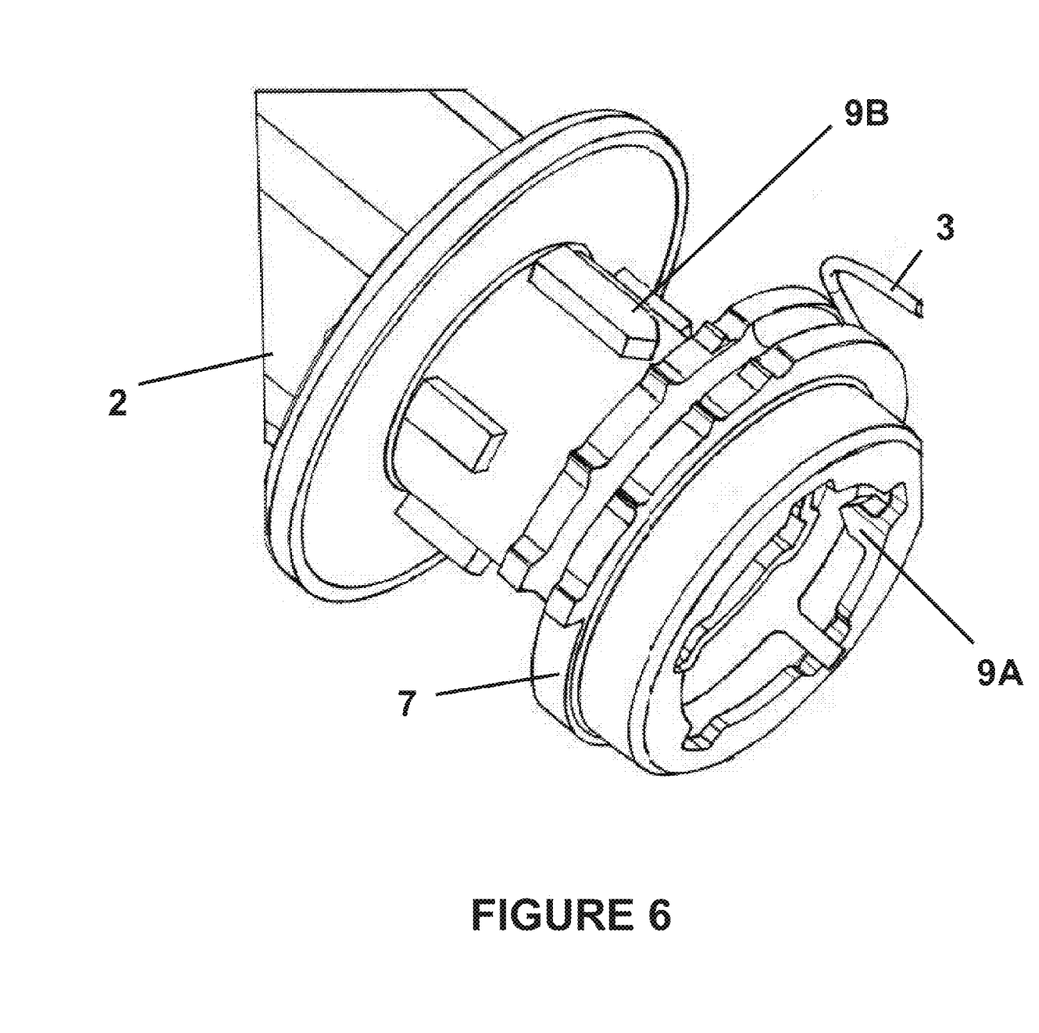
FIG. 6 shows a perspective partial schematic view of another embodiment of a speed changer according to the invention and FIG. 7 shows a perspective partial schematic view of another embodiment of the speed changer according to the invention.

In still another embodiment shown in FIG. 6, the jaw 9'A, 9'B extends between the operating mechanism 7 of the front cable and a flange that rotates jointly with the grip 2. In this case, the drum 8A, during its axial displacement, causes axial driving of the winch 7A that is being held by its jaw with the flange that jointly rotates with the grip 2. It is thus observed that, as shown in FIG. 1, in any angular position of the drum 8A or of the assembly consisting of the rear cable operating mechanism 8, the means of immobilization, moreover, control the axial displacements of this mechanism to then allow coupling by jaw clutching of the operating mechanism 8 with the operating mechanism 7. Moreover, to allow take-up of the operating play of the type described above, the teeth 9A, 9B of the jaw that equip one of the operating mechanisms 7, 8 are installed with angular play on said mechanism. Thus, in the example shown, the tooth 9A is installed with angular play on the front surface of the winch 7A and is equipped with a spring 10 that tends to return the tooth 9B in a direction opposite to that resulting from the force applied by the gearshift spring.

In the examples shown, the operating mechanism 7 of the front cable 3 is of a different nature from the operating mechanism 8 of the rear cable 4 to the extent that it only allows release or pulling of the front cable 3 for the same direction of rotation of the grip 2. This operating mechanism 7 of the front cable 3 is composed of a winch 7A equipped with a throat 7B for winding the front cable 3. This winch 7A has a plurality of predetermined angular positions, each corresponding to one position of the front gearshift 5 on a chainwheel. This winch 7A is returned into any of the angular positions by the action of a spring connected to the front gearshift 5. This winch 7A is immobilized in any angular position via stops 15 that extend between two tracks 16, 17 that are annular with respect to the differentiated profile, the one shown at 17 arranged on the front surface of the winch 7A, the other shown at 16 arranged on a piece that rotates jointly with the grip 2. These axially movable stops that follow an axis that is parallel to the axis of rotation of the grip 2, depending on the profile of the tracks, can be retracted to the interior of a recess of the piece that rotates jointly with the grip to allow free rotation of the winch 7A or can be kept in the projecting position of said piece to come to rest in the recess of the winch 7A in order to prevent rotation of the winch in one direction corresponding to that obtained under the action of the spring linked to the front gearshift 5.

Figure 2:
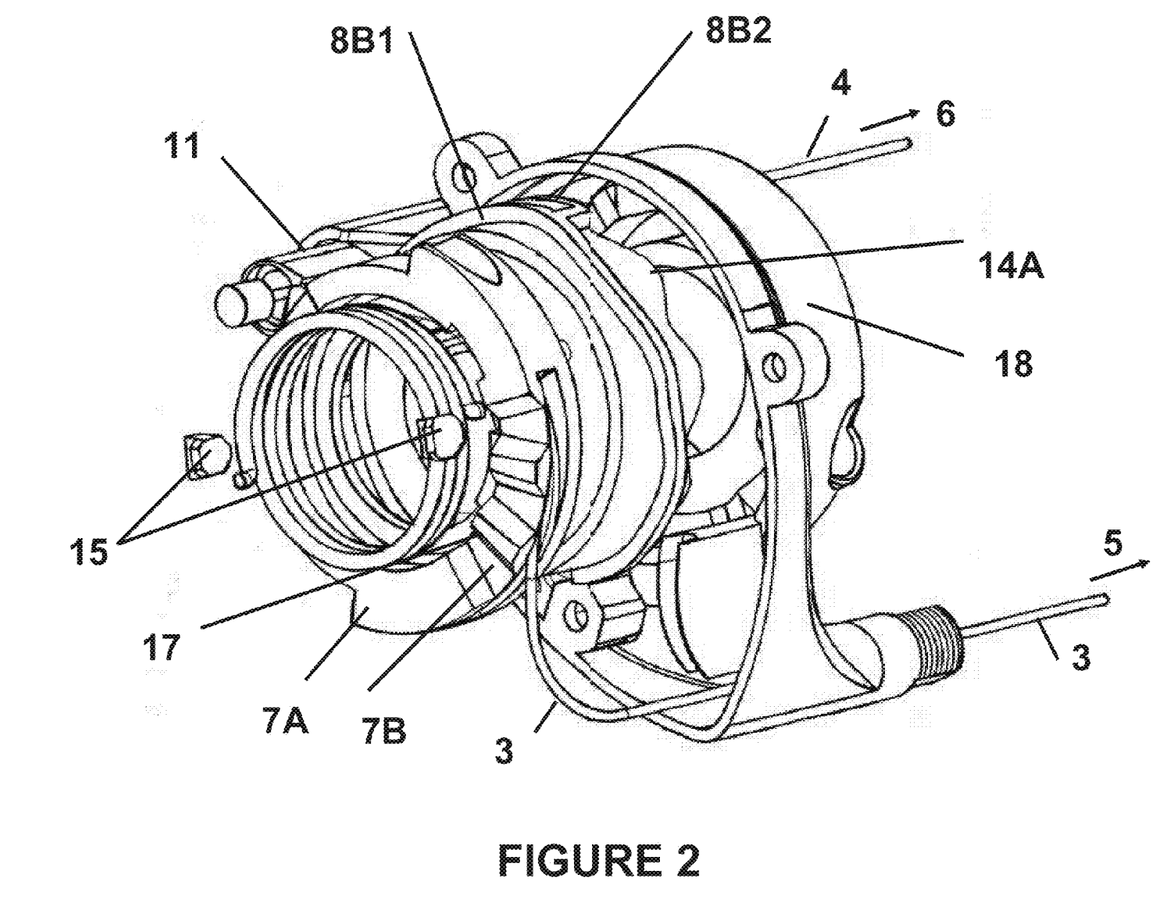
FIG. 2 shows a partial perspective view of a speed changer, the subject matter of the invention, in the state of being removed from the grip, and of one part of the case.
Figure 3:
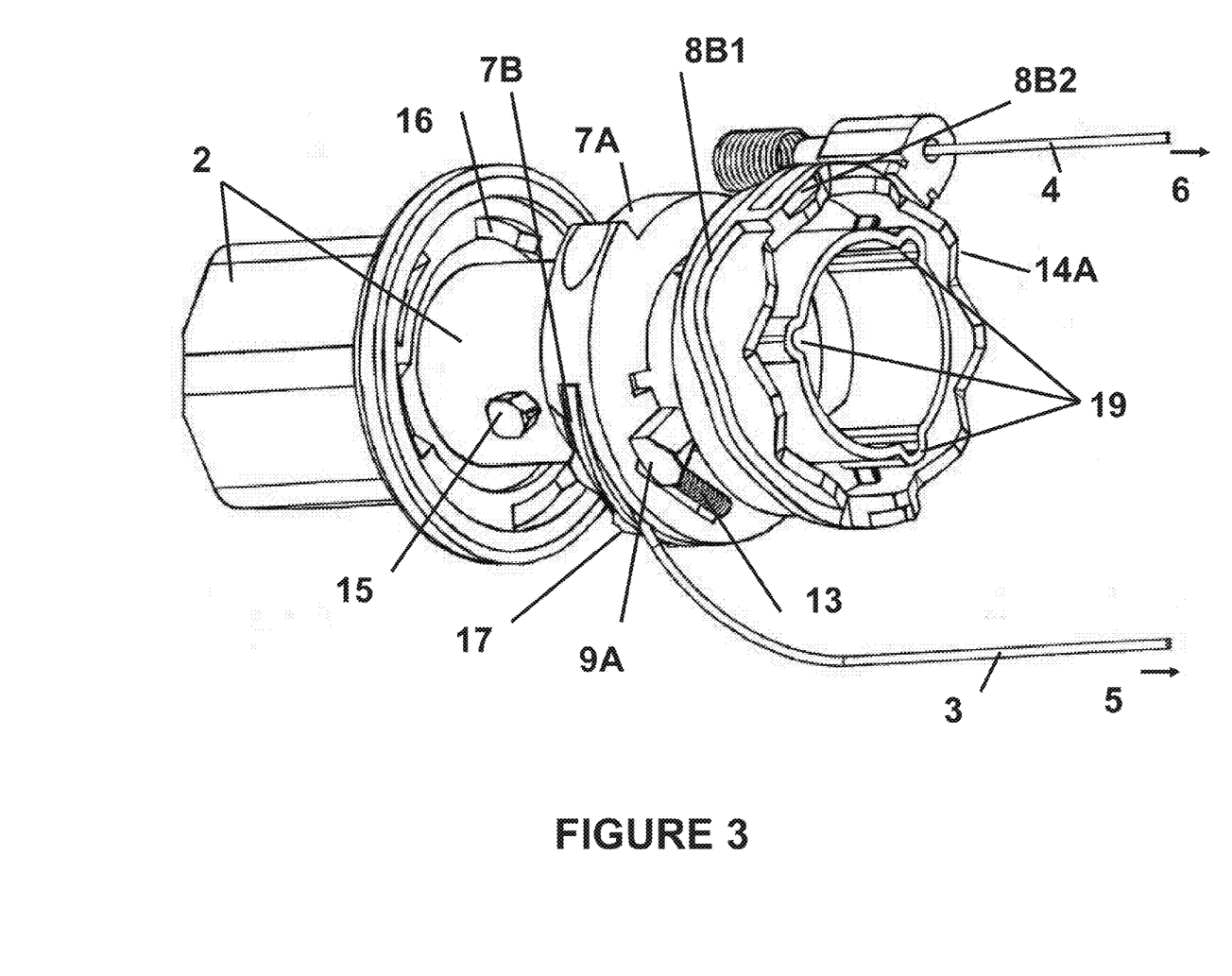
FIG. 3 shows a partial perspective view of a speed changer, the subject matter of the invention, in which the part of the case opposite the one bearing the grip has been removed.

Thus, when passage from one chainwheel N to chainwheel N+1 is desired, the displacements conform to those shown in FIG. 4A to FIG. 4E. The grip 2 is quite obviously rotationally driven. This grip 2 is generally provided on its axis with fluting that is designed to interwork with the drum 8A of the gearshift operating mechanism 8 of the rear cable 4 of the rear gearshift 6 in order to rotationally drive the drum 8A of the operating mechanism. During its displacement, the drum 8A via its jaw teeth 9B begins to interwork with the teeth 9A borne by the winch 7A of the operating mechanism 7 of the chainwheel gearshift 5. This coupling is possible due to the axial displacement of the drum 8, axial displacement induced by the interworking of the notches 14A and of the teeth 14B described above. The tracking of the rotational displacement of the grip 2 (to the right in FIGS. 4A to 4E) causes rotational driving in the same direction, i.e., to the right of the front cable 3 in the direction of pulling of the cable of the front gearshift 5, an action that is applied against the return spring with which this gearshift is equipped. Thus, the drum 8A is first displaced axially from FIG. 1 to FIG. 2 by rotation of the grip 2. This axial movement of the drum puts the teeth 9B of the drum 8A in contact with the teeth 9A of the winch 7A in such a way as to allow rotational driving of the winch 7A.

Figures 4A, 4B:
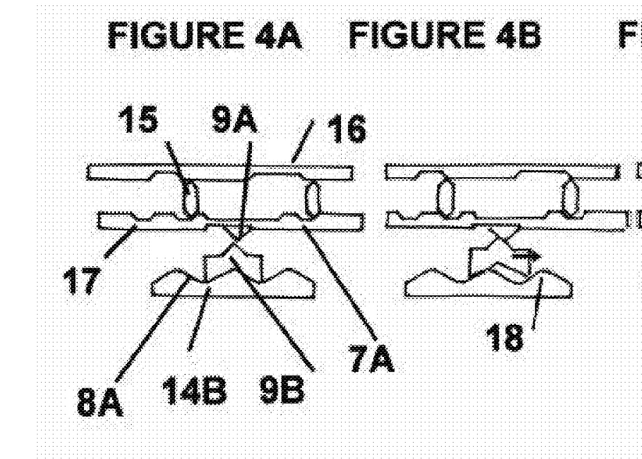
FIGS. 4A to 4J show schematic views illustrating, for FIGS. 4A to 4E, the pulling of the front cable, and, for FIGS. 4F to 4J, the release of the front cable, respectively.
Figure 4C:
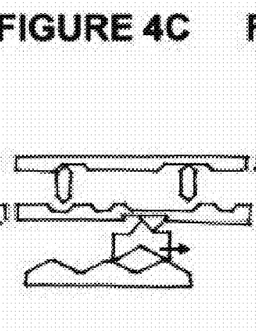

In FIG. 4C, the winch 7A is then rotationally driven via the drum 8A when tracking the rotational displacement of the grip 2. The movable stops 15 are placed in the notches of the track 16, allowing such a rotational displacement.

Figure 4D:
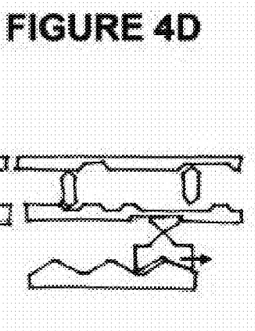
Figure 4E:
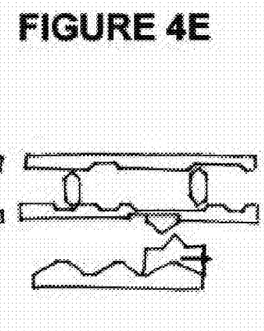
Figure 4F:
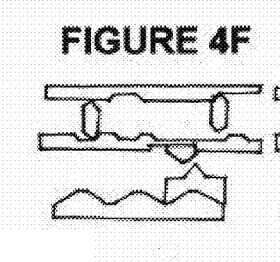
Figure 4G:
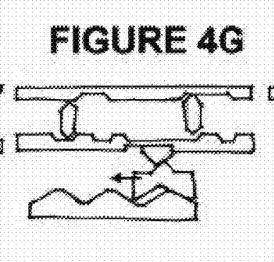

In FIG. 4D, the drum 8A tends to move axially in the opposite direction in order to be angularly immobilized due to the interworking of the teeth 14A of the drum 8A with the notches 14B borne by a fixed piece of the case 18. The winch 7A is then no longer rotationally driven. It is exposed to the action of the return spring that is connected to the front gearshift. It is at this instant that the stops 15 take effect to immobilize this winch 7 especially by interworking of these stops 15 with the tracks 16 and 17. Actually, at least one of the stops 15 is axially immobilized in translation and comes to rest within the notch of the track 17 such that displacement of the winch 7A to the left in FIG. 4E is prevented. To obtain release of the front cable 3 and to allow passage from a chainwheel N+1 to a chainwheel N, these displacements conform to those shown in FIGS. 4F to 4J. The drum 8A is first of all rotationally driven by the grip 2 and is displaced to the left in FIG. 4F. While it is being rotationally driven, it moves axially because of its angular immobilization means and comes into contact with the jaw teeth borne by the winch 7A for winding the front cable 3. It then acts on the jaw tooth 9A and simply induces displacement of the tooth 9A that is loaded by the spring as shown in FIG. 4H.

Once this tooth 9A is stopped, the tracking of the displacement of the drum 8A then causes rotational driving of the winch 7A as far as the position in which it is again rotationally immobilized via a movable stop 15, the drum 8A is itself immobilized by the interworking of the teeth 14A and notches 14B.

Figure 4H:
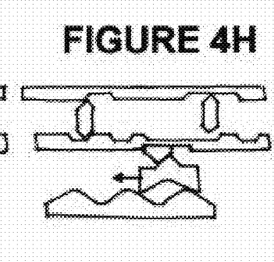
Figure 4I:
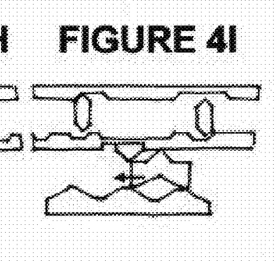
Figure 4J:
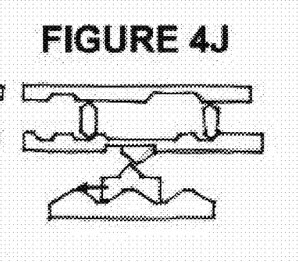
Figure 5:
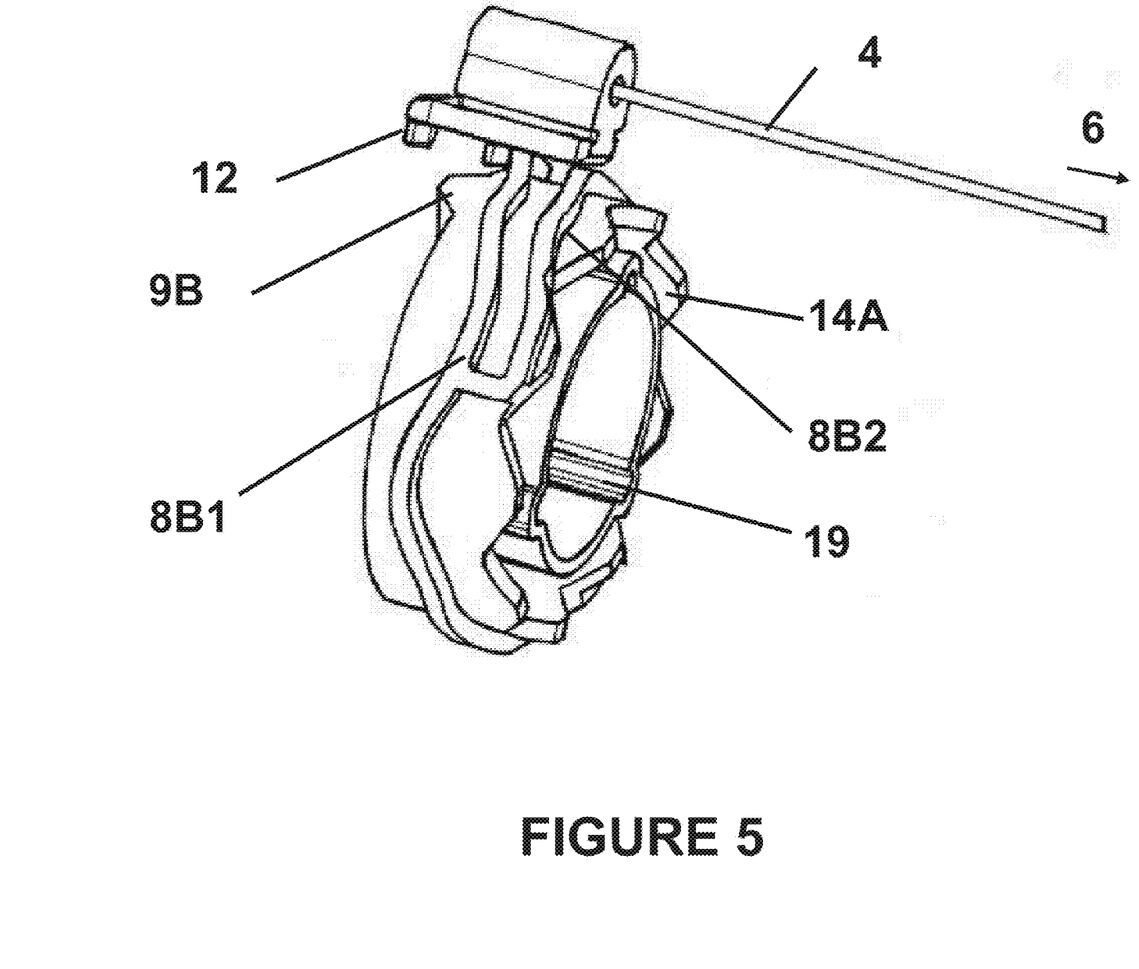
FIG. 5 shows a partial schematic view of the rear gearshift operating mechanism.

FIG. 4H shows the phenomenon of undershifting. Actually, in this figure, it is noted that the release of the cable that will be obtained will be reduced in relation to the relative movement between the drum and the winch. Thus, this arrangement of the stops 15 makes it easier to amplify or minimize desired cable movements when the cable is being pulled or released.

The invention claimed is:

1. A speed changer with predetermined gears for control by cables, based on a single rotating grip, said changer comprising:
   two cable operating mechanisms located within a case, a first one of said operating mechanisms is for a cable of a front gearshift, a second one of said operating mechanisms is for a cable of a rear gearshift, the second operating mechanism, jointly in rotation with the rotating grip, being configured to induce release or pulling of the cable for the rear gearshift during rotation of the rotating grip in a same direction,
   wherein a rotary assembly formed at least from the second operating mechanism and the rotating grip is rotationally coupled intermittently to the first operating mechanism by an intermittent rotary coupling, the first operating mechanism, when coupled, induces pulling or release of the cable of the front gearshift depending on a direction of rotation of the rotating grip.

2. The speed changer according to claim 1, wherein the rotary assembly formed from the second operating mechanism and the rotating grip is rotationally coupled in an intermittent manner to the first operating mechanism via at least one element that rotates jointly with the rotating grip and that moves axially in a direction parallel to an axis of rotation of the rotating grip during rotational displacement of the rotating grip.

3. The speed changer according to claim 2, wherein the intermittent rotary coupling of the assembly composed of the second operating mechanism and the rotating grip with the first operating mechanism is obtained by at least one axial displacement of the second operating mechanism in a direction essentially parallel to an axis of rotation of the rotating grip during one rotation of the rotating grip.

4. The speed changer (1) according to claim 2, wherein the assembly formed by the second operating mechanism and the rotating grip is rotationally coupled intermittently with the first operating mechanism by jaw clutching.

5. The speed changer (1) according to claim 2, the second operating mechanism is composed of a drum that rotates jointly with the rotating grip, an outside periphery of said drum comprising at least one track for guiding a head of the cable of the rear gearshift, said head moving translationally in a direction that is essentially parallel to an axis of rotation of the rotating grip as said head follows a profile of the at least one track obtained by rotation of the rotating grip, displacement of said head, depending on the direction of translational movement, inducing release or pulling of the cable of the rear gearshift.

6. The speed changer according to claim 1, wherein the intermittent rotary coupling of the assembly composed of the second operating mechanism and the rotating grip with the first operating mechanism is obtained by at least one axial displacement of the second operating mechanism in a direction essentially parallel to an axis of rotation of the rotating grip during one rotation of the rotating grip.

7. The speed changer (1) according to claim 6, the second operating mechanism is composed of a drum that rotates jointly with the rotating grip, an outside periphery of said drum comprising at least one track for guiding a head of the cable of the rear gearshift, said head moving translationally in a direction that is essentially parallel to an axis of rotation of the rotating grip as said head follows a profile of the at least one track obtained by rotation of the rotating grip, displacement of said head, depending on the direction of translational movement, inducing release or pulling of the cable of the rear gearshift.

8. The speed changer according to claim 1, wherein the assembly formed by the second operating mechanism and the rotating grip is rotationally coupled intermittently with the first operating mechanism by jaw clutching.

9. The speed changer according to claim 8, wherein a jaw extends between the first operating mechanism and the second operating mechanism, teeth of the jaw equipping one of the first and second operating mechanisms mounted with angular play to take-up the angular play.

10. The speed changer (1) according to claim 9, the second operating mechanism is composed of a drum that rotates jointly with the rotating grip, an outside periphery of said drum comprising at least one track for guiding a head of the cable of the rear gearshift, said head moving translationally in a direction that is essentially parallel to an axis of rotation of the rotating grip as said head follows a profile of the at least one track obtained by rotation of the rotating grip, displacement of said head, depending on the direction of translational movement, inducing release or pulling of the cable of the rear gearshift.

11. The speed changer (1) according to claim 8, the second operating mechanism is composed of a drum that rotates jointly with the rotating grip, an outside periphery of said drum comprising at least one track for guiding a head of the cable of the rear gearshift, said head moving translationally in a direction that is essentially parallel to an axis of rotation of the rotating grip as said head follows a profile of the at least one track obtained by rotation of the rotating grip, displacement of said head, depending on the direction of translational movement, inducing release or pulling of the cable of the rear gearshift.

12. The speed changer (1) according to claim 1, wherein the second operating mechanism is composed of a drum that rotates jointly with the rotating grip, an outside periphery of said drum comprising at least one track for guiding a head of the cable of the rear gearshift, said head moving translationally in a direction that is essentially parallel to an axis of rotation of the rotating grip as said head follows a profile of the at least one track obtained by rotation of the rotating grip, displacement of said head, depending on the direction of translational movement, inducing release or pulling of the cable of the rear gearshift.

13. The speed changer according to claim 12, wherein the head is composed of two lugs that interwork alternately with one segment of the at least one track of the drum, the at least one track being composed of two segments that are axially offset.

14. The speed changer according to claim 12, wherein the head is provided with a spring that returns part of the head in permanent contact with the at least one track.

* * * * *